(No Model.)

F. M. HINER.
RUNNING GEAR FOR CHILDREN'S CARRIAGES.

No. 531,681. Patented Jan. 1, 1895.

WITNESSES:
F. A. Cutter
T. Spencer Sprague

INVENTOR
Frank M. Hiner
By H. S. Sprague
Atty

UNITED STATES PATENT OFFICE.

FRANK M. HINER, OF CANTON, OHIO.

RUNNING-GEAR FOR CHILDREN'S CARRIAGES.

SPECIFICATION forming part of Letters Patent No. 531,681, dated January 1, 1895.

Application filed May 14, 1894. Serial No. 511,100. (No model.)

*To all whom it may concern:*

Be it known that I, FRANK M. HINER, a citizen of the United States, residing at Canton, in the county of Stark and State of Ohio, have invented certain new and useful Improvements in Running-Gear, of which the following, with the accompanying drawings, is a specification.

This invention relates to certain new and useful improvements in running gear.

The invention has for its object the construction of a running gear, which is primarily designed for use in baby carriages, so arranged as to admit of the carriage being guided through the medium of certain levers intermediate between the handle bar and the front wheels, and by means of which the carriage may be turned upon short angles without the necessity of lifting either end from the ground.

The invention consists in the peculiar construction, arrangement and combinations of the parts, all as more fully hereinafter set forth and pointed out in the claim.

Figures 1, 4:
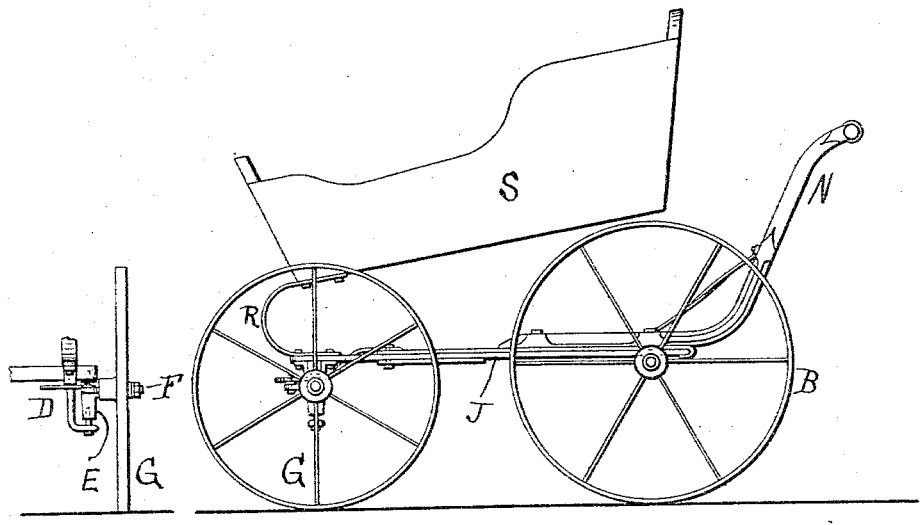
Figure 2:
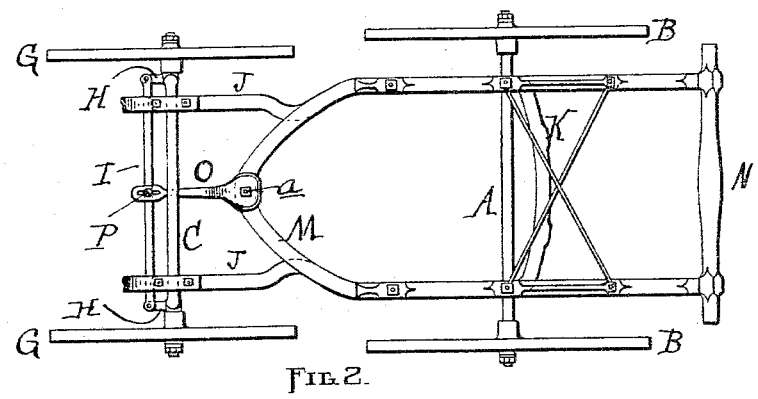
Figure 3:
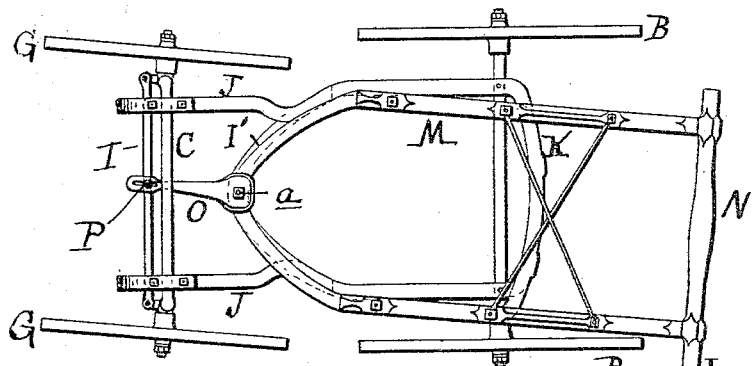

In the accompanying drawings which form a part of this specification Figure 1 is a side elevation. Fig. 2 is a top plan of the gear with the body removed, and with the wheels in their relative positions as when traveling forward in a direct line. Fig. 3 is a similar view with the front wheels adjusted so as to turn the carriage to the right. Fig. 4 is a front elevation of one of the forward wheels showing manner of pivotally securing same to front axle bar.

A represents the rear axle, upon the arms of which the rear wheels B are mounted, as in the ordinary manner.

C represents the front axle bar.

D are steps, one near each end of the axle bar, and between these steps and the projecting ends of the axle bar a casting E is pivotally secured, each of which carries a stub-axle F, upon which the front wheels are mounted. Each of the castings E is provided with a forwardly extending arm H, by means of which and the bar I the front wheels are practically connected so as to admit of their being simultaneously guided to the right or left, as hereinafter set forth.

J J, are reach bars which are rigidly secured to the axle bar C and axle A. These reach bars are connected together by a segmental bar K at their rear ends and by an intermediate bar I', a short distance to the rear of the front axle bar.

M represents a frame which is pivotally connected to the cross-bar I', as at $a$, the side bars of this frame M being bent so as to loosely embrace the bar K as shown in Fig. 1, and to these side bars the handle N is secured as in the ordinary manner.

O is an arm rigidly secured to the frame M, its forward end being slotted to engage with a pin P projecting upwardly from the bar I.

By this construction and arrangement of the parts it will readily be seen that, by pushing the handle to the right or left, the front wheels may be caused to assume a position angular to the axle bar (Fig. 3), thereby greatly facilitating the turning of the carriage, and without being compelled to raise the front wheels from the ground as is the case in carriages wherein the front wheels are secured upon rigid axle-arms.

R are springs which support the body S.

What I claim as my invention is—

In a baby carriage, in combination, a rear axle A, carrying wheels B, a front axle C, castings E pivotally secured at the ends of said axle C, and carrying stub-axles F, a bar I, connecting said castings, wheels G upon said stub-axles, rigid reach bars J connecting front and rear axles, a segmental bar K and an intermediate bar I', connecting said reach bars, a frame M, pivotally connected to said intermediate bar I' and having a slotted arm O engaging with a pin P on the bar I, handles N rigidly secured to said frame M, springs R and body S, the parts being constructed, arranged and operating in the manner and for the purpose set forth.

In testimony whereof I affix my signature, in presence of two witnesses, this 23d day of November, 1893.

FRANK M. HINER.

Witnesses:
H. S. SPRAGUE,
T. SPENCER SPRAGUE.